(12) United States Patent
Yamauchi et al.

(10) Patent No.: US 8,901,890 B2
(45) Date of Patent: Dec. 2, 2014

(54) BATTERY SYSTEM

(71) Applicant: Hitachi, Ltd., Tokyo (JP)

(72) Inventors: Shin Yamauchi, Mito (JP); Ryo Inaba, Isehara (JP)

(73) Assignee: Hitachi, Ltd., Tokyo (JP)

( * ) Notice: Subject to any disclaimer, the term of this patent is extended or adjusted under 35 U.S.C. 154(b) by 58 days.

(21) Appl. No.: 13/771,570

(22) Filed: Feb. 20, 2013

(65) Prior Publication Data

US 2013/0244065 A1     Sep. 19, 2013

(30) Foreign Application Priority Data

Mar. 15, 2012   (JP) .................. 2012-058175

(51) Int. Cl.
*H02J 7/00*   (2006.01)
*H01M 2/34*   (2006.01)
*H02J 3/38*   (2006.01)

(52) U.S. Cl.
CPC  *H01M 2/34* (2013.01); *Y02E 60/12* (2013.01); *H02J 3/382* (2013.01); *Y02E 10/763* (2013.01)
USPC .......................................... 320/128; 429/61

(58) Field of Classification Search
CPC ..... Y02E 60/12; Y02E 10/763; Y02E 10/563; Y02T 10/7005; H01M 10/441; H01M 2010/4271; H01M 2/34; H01M 10/4207
USPC ................................ 429/61; 320/118, 127, 128
See application file for complete search history.

(56) References Cited

U.S. PATENT DOCUMENTS

| 8,203,309 | B2 * | 6/2012 | Maegawa | 320/128 |
| 8,749,204 | B2 * | 6/2014 | Majima et al. | 320/149 |
| 2010/0237828 | A1 * | 9/2010 | Maegawa | 320/118 |
| 2011/0156643 | A1 * | 6/2011 | Chen et al. | 320/109 |
| 2011/0187329 | A1 * | 8/2011 | Majima et al. | 320/149 |
| 2012/0056587 | A1 * | 3/2012 | Iida et al. | 320/118 |

FOREIGN PATENT DOCUMENTS

JP     2011-211790 A     10/2011

* cited by examiner

*Primary Examiner* — Stewart Fraser
(74) *Attorney, Agent, or Firm* — Crowell & Moring LLP (57) ABSTRACT

There is provided a battery system made up by connecting multiple battery units in parallel with each other, the battery units having multiple battery banks, respectively, and multiple switching circuits connected in series to the battery banks, respectively. A switching circuit is made up by connecting a first circuit connected in series to a precharge resistor having a known resistance value, in parallel with a second circuit having a second switch. Timing for turning the second switch into the on state under an equal-current condition when the connection-target battery unit is connected to the battery system is controlled by a controller for controlling the respective outputs of the plural battery units.

7 Claims, 9 Drawing Sheets

BATTERY SYSTEM

BACKGROUND

The present invention relates to a battery system made up by connecting multiple battery modules, each thereof being made up by connecting multiple storage cells with each other, in parallel with multiple battery units, each thereof having a switching circuit connected in series to each of the battery modules.

An electric power system (a system in which power generation, power transformation, power transmission, and power distribution are integrated together) originating from natural energy, called renewable energy, such as wind power generation, solar power generation and so forth, has most recently been upgraded. The electric power system originating from the natural energy has an advantage in that a burden imposed on natural environments is less, but the generation capacity thereof is dependent on the natural environment on the other hand. More specifically, since the wind power and the intensity of sunlight vary from hour to hour, there is concern about a possibility that such variation will have an adverse effect on the electric power system such as frequency variation and voltage variation.

Progress has lately been made with certainty in development of a battery system for power storage, and experimental introduction thereof into the electric power system, as one of approaches for removing the concern.

In Japanese Unexamined Patent Application Publication No. 2011-211790, there is disclosed a battery system to be mounted in an electric vehicle, as a battery system according to the related art, the battery system being made up by connecting multiple battery modules, each thereof being made up by connecting multiple storage cells with each other, in parallel with multiple battery units, each thereof having a switching circuit connected in series to the battery module.

To describe the battery system in detail, the battery system according to Japanese Unexamined Patent Application Publication No. 2011-211790 includes multiple battery units connected in parallel with a power apparatus such as an inverter (for use in conversion of DC power into AC power), and so forth, a voltage sensor for detecting the respective voltage values of the plural battery units, and a controller for controlling respective outputs of the plural battery units. The switching circuit is made up by connecting a first circuit having a first switch connected in series to a precharge resistor, in parallel with a second circuit having a second switch. The first circuit, and second switches each are configured so as to open, or close according to a control signal of the controller.

With the battery system according to Japanese Unexamined Patent Application Publication No. 2011-211790, there are occasions when a battery unit is partially removed from the battery system in order to, for example, perform maintenance of individual battery units. There is possibility that the internal resistance of a storage battery with respect to the partially removed battery unit has varied from the internal resistance of a storage battery belonging to a battery unit connected to the battery system, owing to polarization, and so forth. If a battery unit is connected to the battery system without taking variation occurring to the internal resistance of the storage battery belonging to the battery unit connected to the battery system into consideration, there has existed the risk of an excess current flowing to the battery unit to serve as a target for connection.

In order to avoid such a problem as described, the controller first causes the first switch to be changed from the off condition over to the on condition at the time when the battery unit as the target for connection is connected to the battery system. By so doing, the battery unit is connected to the battery system via the pre-charge resistor. Thereafter, the controller causes the second switch to be changed over from the off condition to the on condition. By so doing, the battery unit is directly connected to the battery system not by the intermediary of the pre-charge resistor.

With the battery system according to Japanese Unexamined Patent Application Publication No. 2011-211790, upon the battery unit to serve as the target for connection being connected to the battery system, it is possible to deter an excess current such as a rush current and so forth, capable of flowing immediately after the connection.

SUMMARY

Now, with the battery system according to Japanese Unexamined Patent Application Publication No. 2011-211790, the controller controls the first switch so as to be changed from the off condition over to the on condition when the battery unit to serve as the target for connection is connected to the battery system, subsequently controlling the second switch so as to be changed from off condition over to the on condition upon checking that a difference between a voltage value at the respective ends of the battery system and a voltage value at the respective ends of the battery unit as the target for connection becomes smaller as compared with a predetermined value (refer to Paragraph No. 0131 in Japanese Unexamined Patent Application Publication No. 2011-211790).

However, if a control for changeover of the second switch from the off state to the on state, based on the difference in the voltage, described as above, is applied to the battery system for power storage in an electric power system using, for example, renewable energy, there has been the risk of inviting a situation in which an excess current cannot be deterred.

To describe about this, after the battery unit to serve as the target for connection is connected to the battery system in a discharging state (the second switch is changed over from the off condition to the on condition), massive current flows to a already-connected battery unit, as compared with the battery unit after connection. This is because, the already-connected battery unit, in the battery system, has a high open circuit voltage (OCV), as compared with a battery unit yet-to-be connected. Magnitude of a discharge current flowing through the battery unit after the connection, and magnitude of a discharge current flowing through the already-connected battery unit undergo convergence over time so as to match up with each other through a distribution process of the discharge current.

Now, suppose a state of the battery system is changed over from discharging to charging in the process of the convergence. Incidentally, changeover in the state of the battery system can suddenly occur to the battery system for power storage in the electric power system using the renewable energy. At this point in time, a charging current flows toward the battery unit after the connection in a concentrated manner. This is because, the battery unit after the connection, in the battery system, has a low open circuit voltage (OCV), as compared with the already-connected battery unit.

Accordingly, if the control for changeover of the second switch from the off state to the on state, based on a difference in the voltage, described as above, is applied to the battery system for power storage in the electric power system using the renewable energy, there has been the risk of inviting the situation in which an excess current cannot be deterred. In this respect, with the battery system according to Japanese Unexamined Patent Application Publication No. 2011-211790, no mention has been made of the deterrence of the excess current capable of occurring, as described above.

The present invention has been developed under circumstances described as above, and it is an object of the invention to provide a battery system capable of deterring an excess current even if the state of the battery system after connection is suddenly changed over from discharging to charging after a battery unit to serve as a target for connection is connected to the battery system.

To that end, the invention provides in its one aspect a battery system as follows:

The battery system is made up by connecting multiple battery units in parallel with each other, the battery unit having a battery bank made up by connecting multiple storage batteries with each other, and a switching circuit connected in series to the battery bank, and the battery system has the main feature in that the switching circuit is made up by connecting a first circuit comprising a first switch connected in series to a precharge resistor in parallel with a second circuit comprising a second switch, the plural battery units each comprise a battery bank voltage detector for detecting a voltage difference between the respective ends of the battery bank, and a first current detector for detecting a current flowing through the battery bank, the battery system has a second current detector for detecting a current flowing through the battery system, the battery system is provided with a controller for controlling respective outputs of the plural battery units, and the controller turns the first switch into the on state in a connection-target battery unit to serve as a target for connection when the connection-target battery unit connected to the battery system turns the first switch into the off state after the second switch is turned into the off state, whereupon the on/off state of the first switch and the second switch, respectively, is controlled on the basis of a current detection information piece of the first current detector, a current detection information piece of the second current detector, and a voltage detection information piece of the battery bank voltage detector when the second switch is turned into the on state.

With the battery system according to the invention, an excess current can be deterred even if a state of the battery system, after connection, is suddenly changed over from discharging to charging after the battery unit to serve as a target for connection is connected to the battery system.

DETAILED DESCRIPTION

A battery system according to an embodiment of the invention is described hereinafter with reference to the accompanying drawings.

(Outline of an Electric Power System to which the Battery System According to the Invention is Applied)

Figure 1:
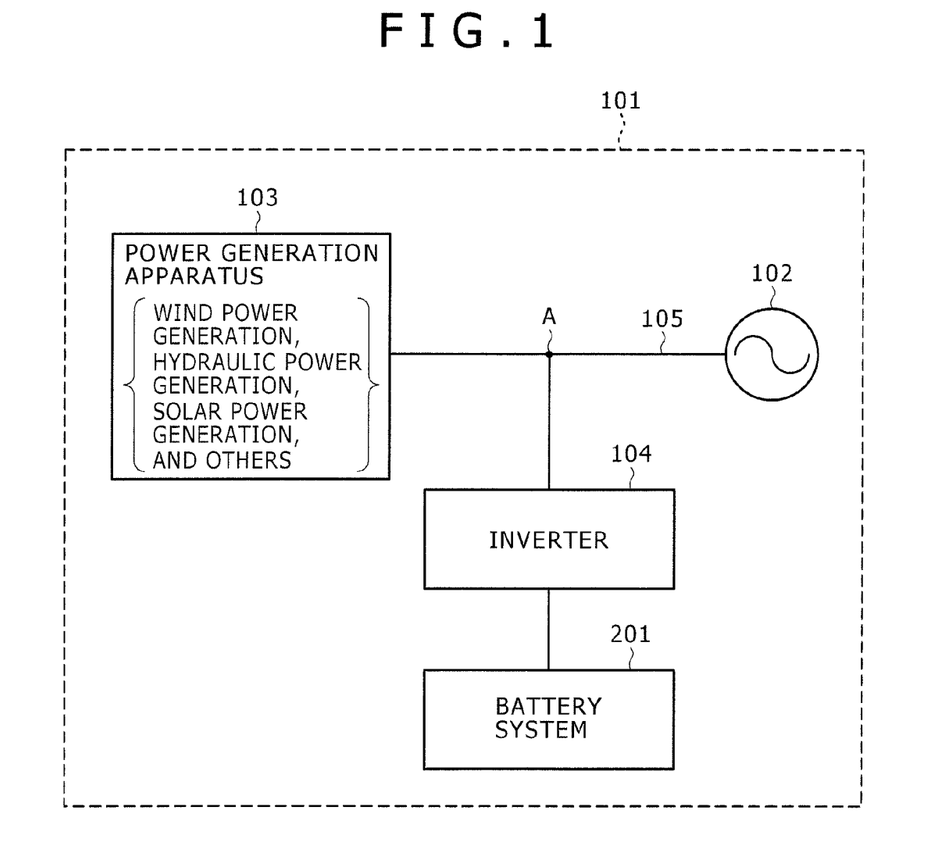
FIG. 1 is a block diagram showing the outline of an electric power system to which a battery system according to the invention is applied.

First, there is described hereinafter an outline of an electric power system to which the battery system according to the invention is applied with reference to FIG. 1. FIG. 1 is a block diagram showing the outline of an electric power system 101 to which a battery system 201 according to the invention is applied.

An electric power system originating from the natural energy, such as the wind power generation, the solar power generation and so forth, has an advantage in that the burden imposed on the natural environments is less, but the generation capacity thereof is dependent on the natural environment on the other hand. More specifically, since the wind power, and the intensity of sunlight vary from hour to hour, there has been concern about the possibility that such variation can have an adverse effect on the electric power system, such as the frequency variation, the voltage variation, and so forth.

As the one of the approaches for removing the concern described as above, there has been proposed an electric power system 101 in which a natural energy power generation apparatus, and a battery system are installed side by side, as shown in FIG. 11, thereby intending to inhibit frequency variation, and voltage variation, occurring to the electric power system.

The electric power system 101 is comprised of a power system 102, a power generation apparatus 103, an inverter 104, and a battery system 201 according to the invention, as shown in FIG. 1. The battery system 201 according to the invention represents a concept encompassing a battery pack 203 corresponding to a battery system according to the embodiment of the invention, described later on.

The power generation apparatus 103 has a function for supplying electric power originating from, for example, the natural energy to the power system 102. The battery system 201 according to the invention is connected to a line 105 for connecting the power generation apparatus 103 to the power system 102 via a connection node A, and the inverter 104, respectively.

The inverter 104 has a function for converting electric power generated by the power generation apparatus 103 into a DC electric power, sending out the DC electric power as converted to the battery system 201, and a function for converting the DC electric power stored in the battery system 201 into AC electric power, sending out the AC electric power as converted to the power system 102. Transmission of the electric power to each load is carried out via the power system 102.

If a natural energy power generation apparatus 103 is adopted as the power generation apparatus 103, the output thereof is subjected to effects of a change in natural environment such as a change in weather, season, and so forth to thereby undergo variation. Such variation in the output invites frequency variation and voltage variation in the power system 102, thereby creating a factor for causing deterioration in the quality of the electric power.

In this respect, the battery system 201 according to the invention can function such that variation in the frequency as well as the voltage of the power system 102 falls within a predetermined scope. More specifically, the battery system 201 has a function for causing the battery system 201 to be charged with excess power if the excess power is supplied to the power system 102 on one hand, whereas power stored in the battery system 201 is discharged if the power system 102 is lacking in power, that is, a co-called buffer function. For this reason, the battery system 201 according to the invention is capable of deterring the frequency variation as well as the voltage variation of the power system 102.

(Hierarchical Structure of the Battery System 201 According to the Invention)

Figure 2:
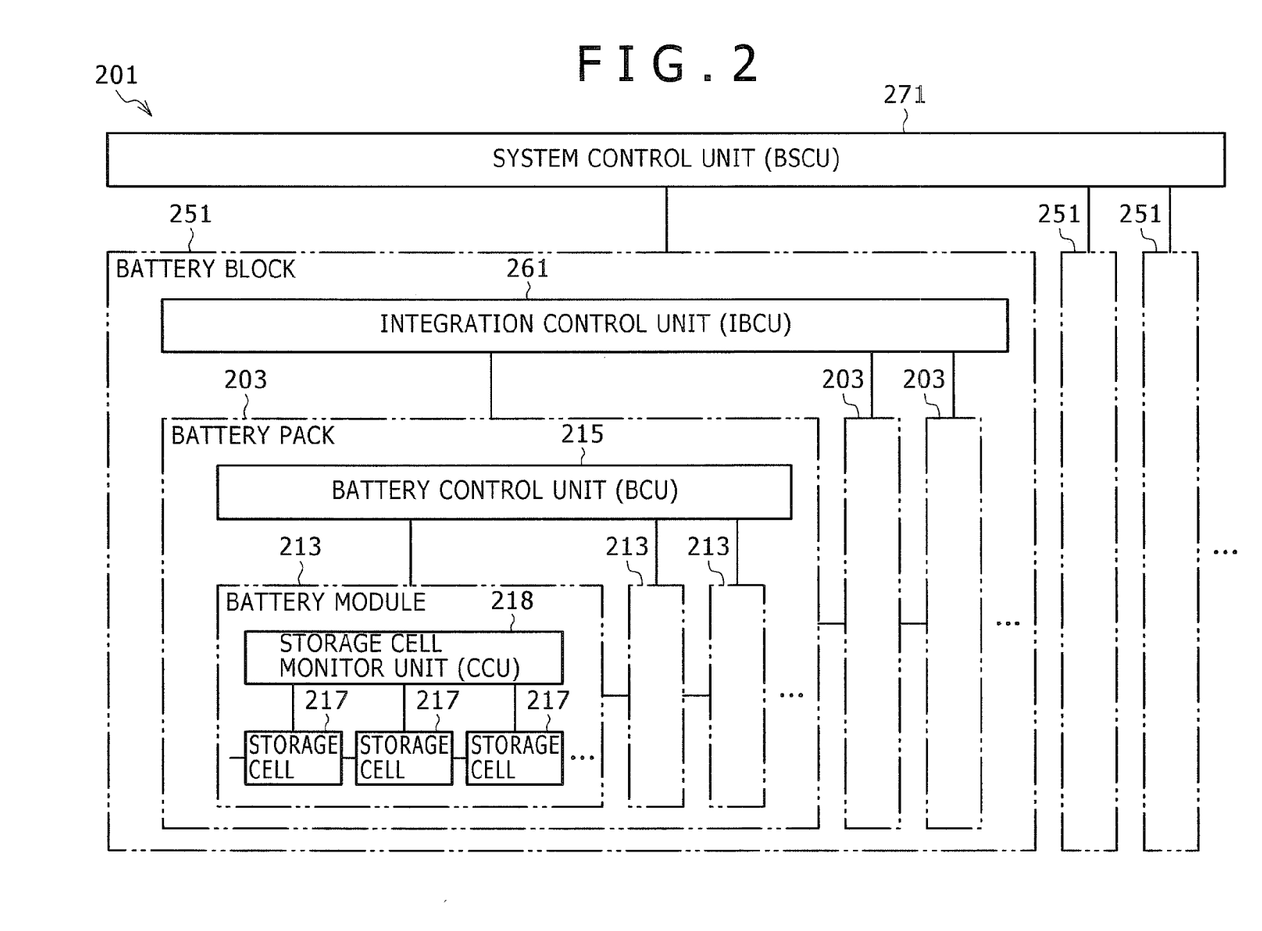
FIG. 2 is a block diagram conceptually depicting the hierarchical structure of the battery system according to the invention.

Next, a hierarchical structure of the battery system 201 according to the invention is described hereinafter with reference to FIG. 2. FIG. 2 is a block diagram conceptually depicting the hierarchical structure of the battery system 201 according to the invention.

The battery system 201 according to the invention is made up by hierarchically stacking a battery module (corresponding to "a battery bank", and "a battery unit" according to the invention) 213 made up by connecting multiple storage cells 217 (corresponding to "storage batteries" according to the invention) with each other, a battery pack (corresponding to "a battery system" according to the invention) 203 made up by connecting multiple the battery modules 213 with each other, and a battery block 251 made up by connecting multiple the battery packs 203 with each other, one after another, as shown in, for example, in FIG. 2, Further, the battery module 213 includes one made up by series connection of the plural storage cells 217 with each other, one made up by connecting the plural storage cells 217 in parallel with each other, and one made up by combination of the plural storage cells 217 as series-connected, and the plural storage cells 217 as connected in parallel with each other.

The battery module 213 is provided with the plural storage cells 217, and a storage cell monitor unit (CCU) 218.

The plural storage cells 217 each are a secondary battery, such as a lithium ion battery, a lead battery, and so forth, having a function for discharging the DC power stored in the storage cell 217, as necessary, while temporarily charging the storage cell 217 with the DC power supplied from the power system 102 via the inverter 104.

The storage cell monitor unit (CCU) 218 has a function for measuring a voltage, temperature, and current, between the terminals of each of the plural storage cells 217, respectively, thereby acquiring information concerning a state of charge (SOC: State Of Charge) of each of the plural storage cells 217. Further, the storage cell monitor unit (CCU) 218 has a function for diagnosing overcharge or over-discharge on the basis of the voltage between the terminals of each of the plural storage cells 217.

The battery pack 203 is provided with the plural battery modules 213, and a battery control unit (BCU) 215, as shown in FIG. 2. The battery control unit (BCU) 215 corresponds to "a controller" according to the invention.

The plural battery modules 213 each have a function for discharging the DC power stored in the battery modules 213, as necessary, while temporarily charging the storage cell 217 with the DC power supplied from the power system 102, as is the case with the storage cell 217.

The battery control unit (BCU) 215 has a function for reporting charge-state information on each of the plural storage cells 217, acquired from the storage cell monitor unit (CCU) 218 via a communication medium (not shown), and administration information on the battery pack 203 to respective controllers at levels higher than the battery control unit (BCU) 215, namely, an integrated batteries control unit (IBCU) 261, and a system control unit (BSCU) 271, respectively, via a communication medium (not shown).

The battery block 251 is provided with the plural battery packs 203, and the integrated batteries control unit (IBCU) 261, as shown in FIG. 2.

The plural battery packs 203 each have a function for discharging the DC power stored in the battery pack 203, as necessary, while temporarily charging the storage cell 217 with the DC power supplied from the power system 102 via the inverter 104, as is the case with the storage cell 217, and the battery module 213, respectively.

The integrated batteries control unit (IBCU) 261 has a function for reporting information acquired from the battery control unit (BCU) 215 via the communication medium, and administration information on the battery block 251 to a controller at a level higher than the integrated batteries control unit (IBCU) 261, namely, the system control unit (BSCU) 271 via a communication medium. The system control unit (BSCU) 271 has a function for administering the respective operations of multiple the battery blocks 251.

(Outline of the Battery System According to the Invention)

The outline of the battery system according to the invention is described hereinafter before an embodiment of the invention is described.

The battery system according to the invention is a battery system made up by connecting multiple battery units in parallel with each other, the battery unit having a battery bank made up by connecting multiple storage batteries with each other, and a switching circuit connected in series to the battery bank, and the battery system has the main feature in that the switching circuit is made up by connecting a first circuit comprising a first switch connected in series to a precharge resistor in parallel with a second circuit comprising a second switch, the plural battery units each comprise a battery bank voltage detector for detecting a voltage difference between the respective ends of the battery bank, and a first current detector for detecting a current flowing through the battery bank, the battery system has a second current detector for detecting a Current flowing through the battery system, the battery system is provided with a controller for controlling respective outputs of the plural battery units, and the controller turns the first switch into the on state in a connection-target battery unit to serve as a target for connection when the connection-target battery unit connected to the battery system turns the first switch into the off state after the second switch is turned into the off state, whereupon the on/off state of the first switch and the second switch, respectively, is controlled on the basis of a current detection information piece of the first current detector, a current detection information piece of the second current detector, and a voltage detection information piece of the battery bank voltage detector when the second switch is turned into the on state.

Further, with the embodiment of the invention, as described later on, the storage cell 217 corresponds to "a storage battery" according to the invention, the battery module 213 corresponds to "a battery bank", and "a battery unit" according to the invention, and the battery pack 203 corresponds to "a battery system (a battery sub-system)" according to the invention, respectively.

With the battery system 203, an excess current can be deterred even if a state of the battery system, after connection, is suddenly changed over from discharging to charging after the battery unit to serve as the target for connection is connected to the battery system.

(A Battery System 203A According to a Comparative Example)

Figure 3A:
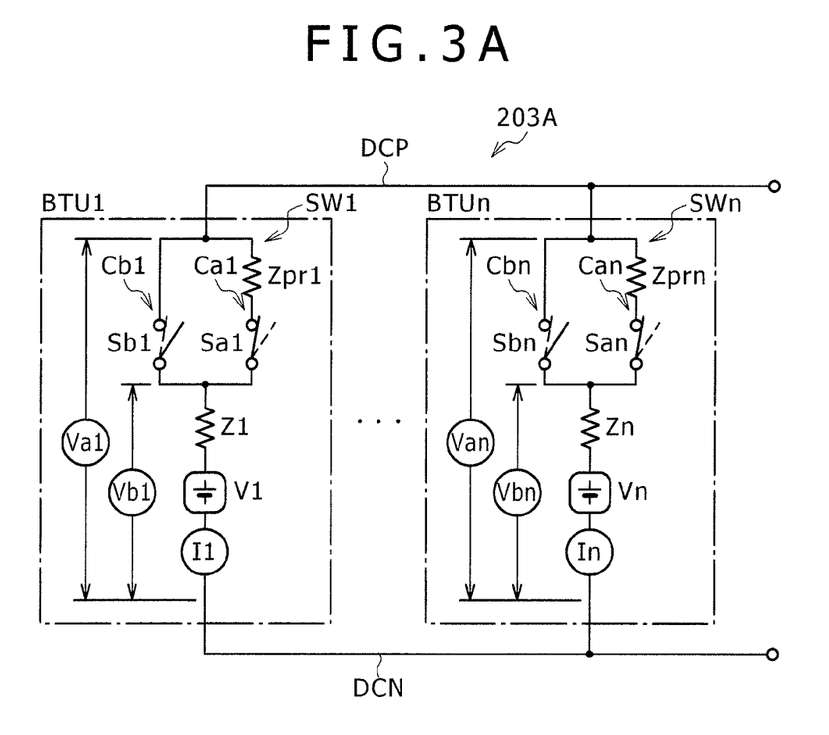
FIG. 3A is a circuit diagram of a battery system according to a comparative example.
Figure 3B:
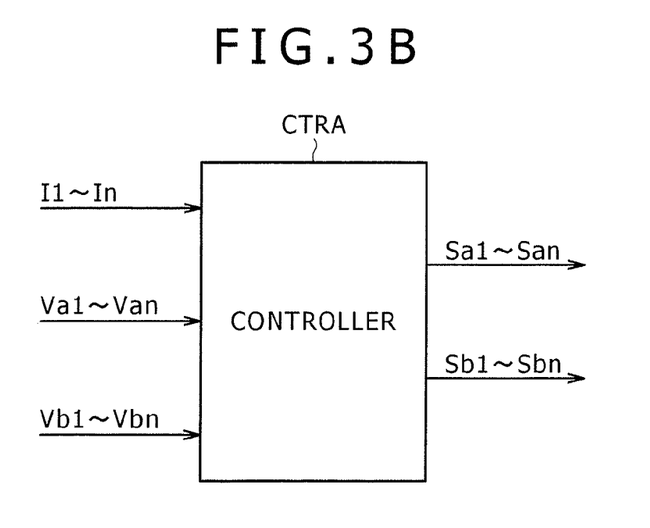
FIG. 3B is a view showing input/output signals of the battery system according to the comparative example.

Now, in order to demonstrate superiority of the battery system 203 according to the invention, the outline of a battery system 203A according to the comparative example is described hereinafter with reference to FIGS. 3A, 3B. FIG. 3A is a circuit diagram of the battery system 203A according to the comparative example. FIG. 3B is a view showing input/output signals of the battery system 203A according to the comparative example.

The battery system 203A according to the comparative example is made up by connecting multiple battery units BTU1, . . . , BTUn in parallel with each other, the battery units having multiple battery banks V1-Vn (provided that "n" is a natural number: the same applies hereinafter), respectively, and multiple switching circuits SW1, . . . , SWn connected in series to the battery banks V1-Vn, respectively, as shown in FIG. 3A.

To be precise, the plural battery units BTU1, . . . , BTUn are made up by series connection of current sensors I1, . . . , In, the battery banks V1-Vn, internal resistors Z1, . . . , Zn of the battery banks V1-Vn, and the switching circuits SW1, . . . , SWn, respectively, with each other, between positive and negative DC buses of the battery system 203A, namely, DCP, DCN, as shown in FIG. 3A. Further, the plural battery units BTU1, . . . , BTUn are provided with the battery bank voltage detectors Vb1, Vbn for detecting a voltage difference between the respective ends of each of the battery banks V1-Vn, and battery unit voltage detectors Va1, . . . , Van for detecting a voltage difference between the respective ends of each of the battery units BTU1, . . . , BTUn, respectively.

The plural switching circuits SW1, . . . , SWn, are made up by connecting first circuits Ca1, . . . , Can, having first switches Sa1, . . . , San, connected in series to precharge resistors Zpr1, . . . , Zprn, having a known resistance value, respectively, in parallel with the second circuits Cb1, . . . , Cbn, having second switches Sb1, . . . , Sbn, respectively, as shown in FIG. 3A.

For the first switches Sa1, . . . , San, and the second switches Sb1, . . . , Sbn, respectively, use may be made of, for example, a relay, a power semiconductor switch (for example, IGBT). With the present embodiment, there is described an example in which a relay is used as the first switches Sa1, San, and the second switches Sb1, . . . , Sbn, respectively.

The battery system 203A according to the comparative example is provided with a controller CTRA, as shown in FIG. 3B, in order to cause the first switches Sa1, . . . , San, and the second switches Sb1, Sbn to be turned on/off, respectively. Respective current detection information pieces I1, . . . , In of the current sensors, respective voltage detection information pieces Va1, . . . , Van of the battery units BTU1, . . . , BTUn, and respective voltage detection information pieces Vb1, . . . , Vbn of the battery bank voltage detectors are inputted to the controller CTRA, whereupon the controller CTRA performs a predetermined computation on the basis of the various information pieces inputted thereto, thereby outputting control signals for causing the first switches Sa1, . . . , San, and second switches Sb1, Sbn to be turned on/off, respectively. The controller CTRA has a function for controlling respective outputs of the battery units BTU1, . . . , BTUn.

To be precise, at the time when the battery unit to serve as a target for connection (the battery unit BTU1 shown in FIG. 3A is hereinafter referred to as a connection-target battery unit) is connected to the battery system 203A, the controller CTRA first controls the first switch Sa1 to be changed over from the off state to the on state. By so doing, the battery unit BTU1 is connected to the battery system 203A via the precharge resistor Zpr1. Thereafter, the controller CTRA waits for fulfillment of the on condition of the second switch Sb1, as described later on, thereby controlling the second switch Sb1 to be changed from the off state to the on state. By so doing, the battery unit BTU1 is directly connected to the battery system 203A not by the intermediary of the precharge resistor Zpr1.

In short, with the battery system 203A according to the comparative example, when the connection-target battery unit BTU1 is connected to the battery system 203A, the battery unit BTU1 is connected to the battery system 203A via the precharge resistor Zpr1 immediately after such connection. Accordingly, in the case of the battery system 203A according to the comparative example, it is regarded that an excess current, such as a rush current, and so forth, capable of flowing immediately after the connection, can be deterred.

(The on Condition of the Second Switch Sb1: Equal-Voltage Condition)

Figure 4A:
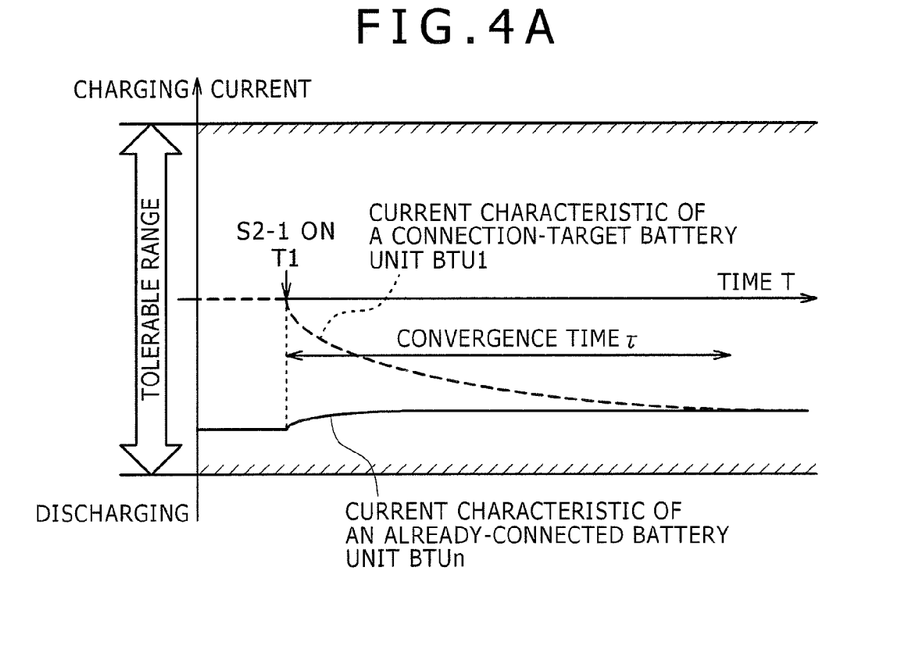
FIG. 4A is a schematic representation showing an operation of the battery system according to the comparative example in the case where an equal-voltage condition is adopted as the on condition of a second switch.
Figure 4B:
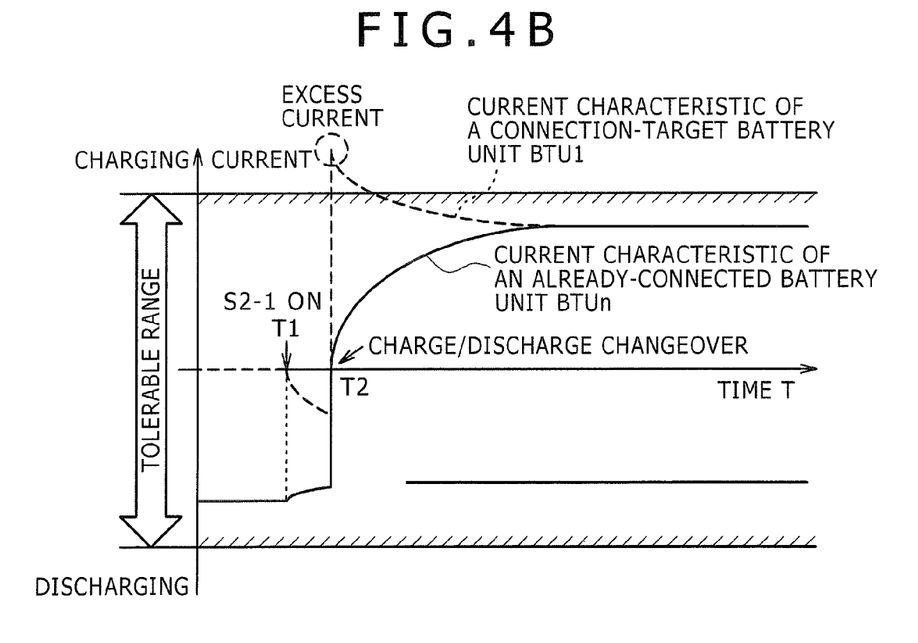
FIG. 4B is a schematic representation showing another operation of the battery system according to the comparative example in the case where the equal-voltage condition is adopted as the on condition of a second switch.

Next, an operation of the battery system 203A according to the comparative example in the case where an equal-voltage condition is adopted as the on condition of the second switch Sb1 is described with reference to FIGS. 4A, 4B. FIGS. 4A, 4B each are a schematic representation showing the operation of the battery system 203A according to the comparative example in the case where the equal-voltage condition is adopted as the on condition of the second switch Sb1.

Further, the equal-voltage condition means the on condition of the second switch Sb1, preset in the controller CTRA, so as to control the second switch Sb1 to be in the on condition in the case where the absolute value |Va1−Van| of a difference between the voltage detection information piece Va1 of the connection-target battery unit BTU1, and the voltage detection information piece Van of the battery unit BTUn that is already connected to the battery system 203A is converged within a predetermined tolerable range.

In the case of the equal-voltage condition being adopted as the on condition of the second switch Sb1, after the connection-target battery unit BTU1 is connected to the battery system 203A in a state of discharging (the second switch is changed from the off state to the on state: refer to elapsed-time T1 in FIG. 4A), massive discharge current flows toward an already-connected battery unit BTUn, as compared with the battery unit BTU1 after connection, as shown in FIG. 4A.

This is because the already-connected battery unit BTUn, in the battery system 203A, has a high open circuit voltage (OCV), as compared with the battery unit BTU1 yet-to-be connected. The magnitude of a discharge current flowing through the battery unit BTU1 after the connection, and the magnitude of a discharge current flowing through the already-connected battery unit BTUn undergo convergence over predetermined convergence time τ so as to match up with each other through the distribution process of the discharge current, previously described, as shown in FIG. 4A.

Now, suppose a state of the battery unit BTU1 after the connection is changed over from discharging to charging at a point in time after elapsed-time T2 in FIG. 4B in the process of the convergence shown in FIG. 4A. Incidentally, such a changeover in the state of the battery system can suddenly occur in the case of a battery system for power storage, in an electric power system using renewable energy. Then, a charging current flows toward the battery unit BTU1 after the connection in a concentrated manner. This is because the battery unit BTU1 after the connection, in the battery system 203A, has a low open circuit voltage (OCV), as compared with the already-connected battery unit BTUn.

Accordingly, if a control for the changeover of the second switch from the off state to the on state, under the equal-voltage condition, as the on condition of the second switch Sb1, is applied to the battery system 203A according to the comparative example, for power storage in the electric power system using renewable energy, there has been the risk of inviting a situation in which an excess current cannot be deterred, as shown in FIG. 4B.

(The on Condition of the Second Switch Sb1: Equal SOC Condition)

Figure 4C:
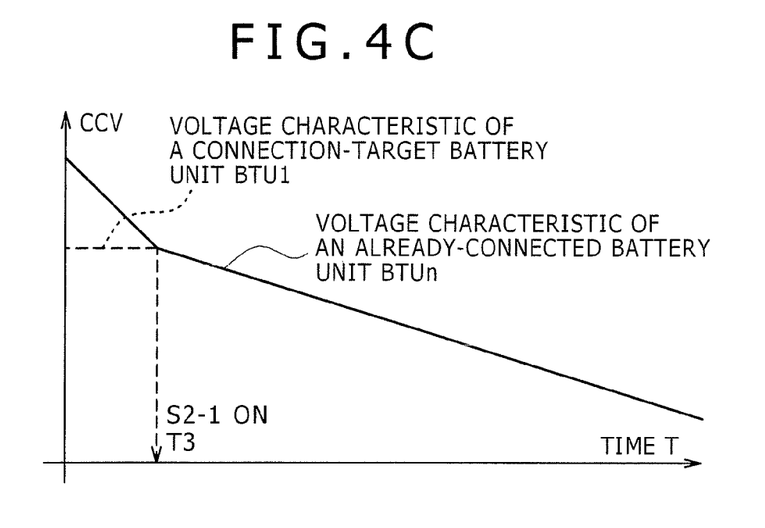
FIG. 4C is a schematic representation showing an operation of the battery system according to the comparative example in the case where an equal-SOC condition is adopted as the on condition of the second switch.
Figure 4D:
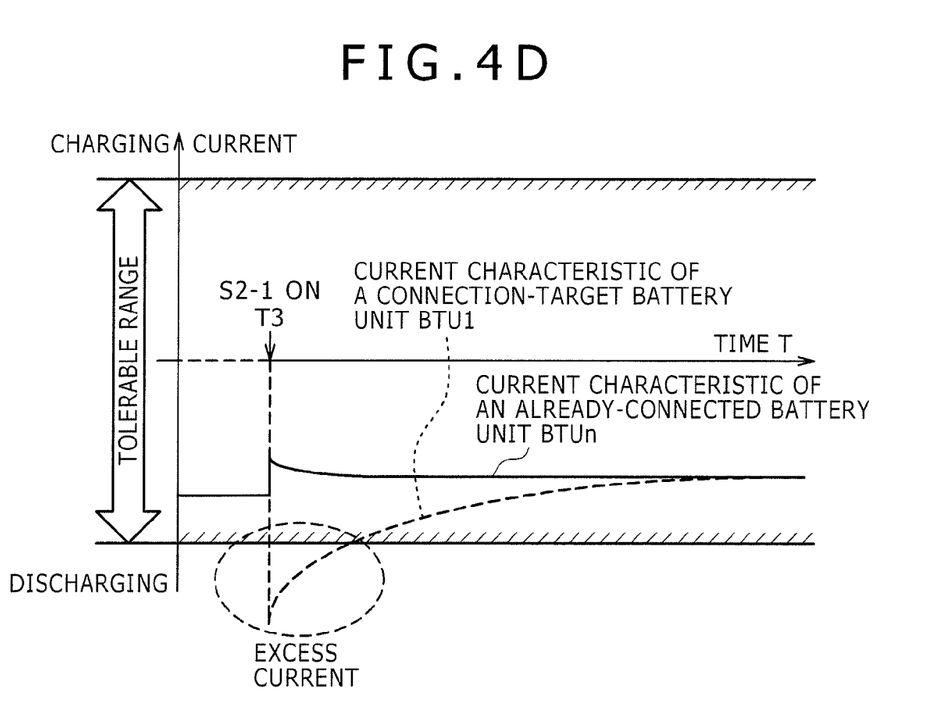
FIG. 4D is a schematic representation showing another operation of the battery system according to the comparative example in the case where the equal-SOC condition is adopted as the on condition of the second switch.

Next, an operation of the battery system 203A according to the comparative example in the case where an equal-SOC (SOC: State Of Charge) condition is adopted as the on condition of the second switch Sb1 is described hereinafter with reference to FIGS. 4C, 4D. FIGS. 4C, 4D each are a schematic representation showing the operation of the battery system 203A according to the comparative example in the case where the equal-SOC condition is adopted as the on condition of the second switch Sb1.

Further, the equal-SOC condition means the on condition of the second switch Sb1, preset in the controller CTRA, so as to control the second switch Sb1 to be in the on condition in the case where the absolute value |Va1−Van| of a difference between an SOC information piece of the connection-target battery unit BTU1 (found on the basis of the voltage detection information piece Va1) and an SOC information piece of the battery unit BTUn already connected to the battery system 203A (found on the basis of the voltage detection information piece Van) is converged within a predetermined tolerable range.

In the case where the equal-SOC condition is adopted as the on condition of the second switch Sb1, after the connection-target battery unit BTU1 is connected to the battery system 203A in a state of discharging (the second switch is changed over from the off state to the on state: refer to elapsed-time T3 in FIG. 4C), a closed circuit voltage (CCV) of the battery unit BTU1 after connection, and a closed circuit voltage (CCV) of the already-connected battery unit BTUn will trail a substantially common locus indicating a linearly decrementing characteristic, as shown in FIG. 4C.

Meanwhile, if the battery unit BTU1 after connection is compared with the already-connected battery unit BTUn from the standpoint of magnitude of respective currents flowing before, and after the elapsed-time T3 in FIG. 4C, there is the risk that the current will not be evenly distributed even under the equal-SOC condition, and an excess current will flow toward the battery unit BTU1 after connection. This is because the battery unit BTU1 after connection differs in magnitude of internal resistance (polarization due to charging/discharging) from the already-connected battery unit BTUn.

For this reason, if the control for the changeover of the second switch from the off state to the on state, under the equal-SOC condition, as the on condition of the second switch Sb1, is applied to the battery system 203A according to the comparative example, there has been the risk of inviting a situation in which an excess current cannot be deterred, as shown in FIG. 4D.

(A Battery Pack 203B Corresponding to the Battery System According to the Embodiment of the Invention)

Figure 5A:
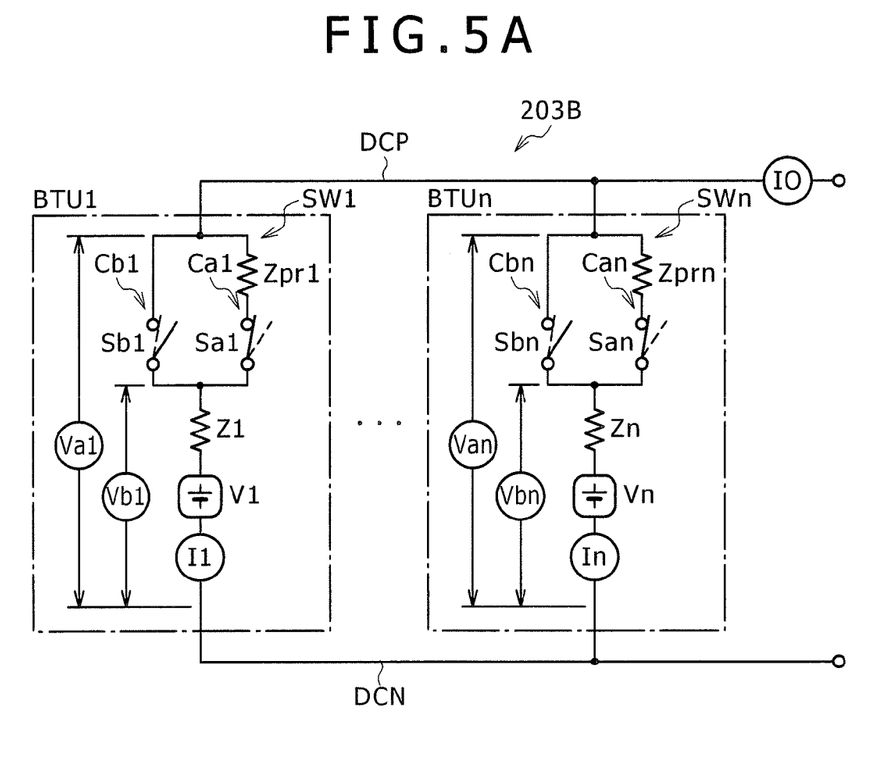
FIG. 5A is a circuit diagram of a battery system according to the embodiment of the invention.
Figure 5B:
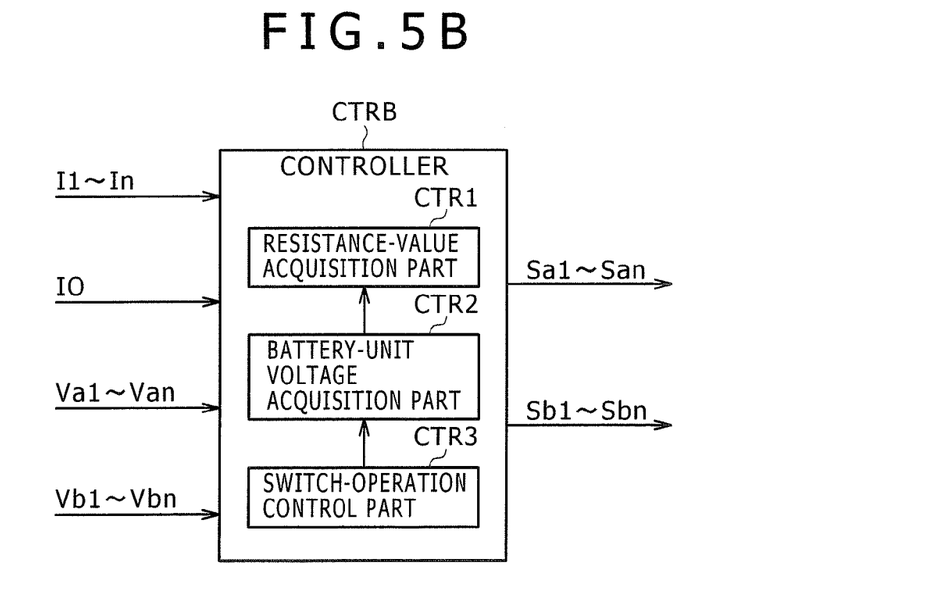
FIG. 5B is a view showing an internal configuration of a controller of the battery system according to the embodiment of the invention, and input/output signals of the controller.

Next, a battery pack 203B corresponding to the battery system according to the embodiment of the invention is described hereinafter with reference to FIGS. 5A, 5B. FIG. 5A is a circuit diagram of the battery system (the battery pack 203B) according to the embodiment of the invention. FIG. 5B is a view showing an internal configuration of a controller CTRB of the battery system (the battery pack 203B), and input/output signals thereof.

The battery system 203A according to the comparative example is similar in respect of fundamental constituent parts thereof to the battery system (the battery pack 203B) according to the present embodiment. Accordingly, as to respective constituent elements of the comparative example, and those of the present invention, members having a common function are denoted by a common sign, thereby omitting repeated description. Further, if a member according to the comparative example, and a member according to the present invention, having a function in common, need be differentiated from each other, "A" is affixed to the end of the common sign of the member according to the comparative example, while "B" is affixed to the end of the common sign of the member according to the present invention. Having taken note of points of difference between the comparative example and the present invention, those points of difference therebetween are hereinafter described, which is to be substituted for description of the battery system (the battery pack) 203B according to the embodiment of the invention.

There are two major points of the difference between the comparative example and the present invention. A first point of the difference is that a positive side DC bus DCP of the battery system (the battery pack) 203B according to the embodiment of the invention is provided with a second current detector I0 for detecting a current flowing through the battery system 203B, as shown in FIG. 5A. A current detection information piece I0 according to the battery system (the battery pack) 203B, detected by the second current detector I0, is sent out to the controller CTRB.

A second point of the difference is that the controller CTRB of the battery system (the battery pack) 203B according to the embodiment of the invention has a resistance-value acquisition part CTR1, a battery-unit voltage acquisition part CTR2, and a switch-operation control part CTR3, as shown in FIG. 5B.

The resistance-value acquisition part CTR1 has a function for acquiring an internal resistance value of the battery system 203B, respective internal resistance values of the battery units BTU1, . . . , BTUn, and respective internal resistance values of the battery banks V1-Vn.

The battery-unit voltage acquisition part CTR2 has a function for acquiring a voltage difference between the respective ends of each of the plural battery units BTU1, . . . , BTUn.

The switch-operation control part CTR3 has a function for controlling the on/off state of the first and second switches Sa1, Sb1, respectively, on the basis of the current detection information piece I1 of the first current detector in the connection-target battery unit BTU1, a current detection information piece I0 of the second current detector, resistance value information pieces Z1, Zn, acquired by the resistance-value acquisition part CTR1, respective voltage detection information pieces Vb1, . . . , Vbn of the battery bank voltage detectors, and respective voltage difference information pieces Va1, . . . , Van, detected by the battery unit voltage detectors Va1, . . . , Van.

{An Operation of the Battery System (the Battery Pack) 203B According to the Embodiment of the Invention}

Figure 6:
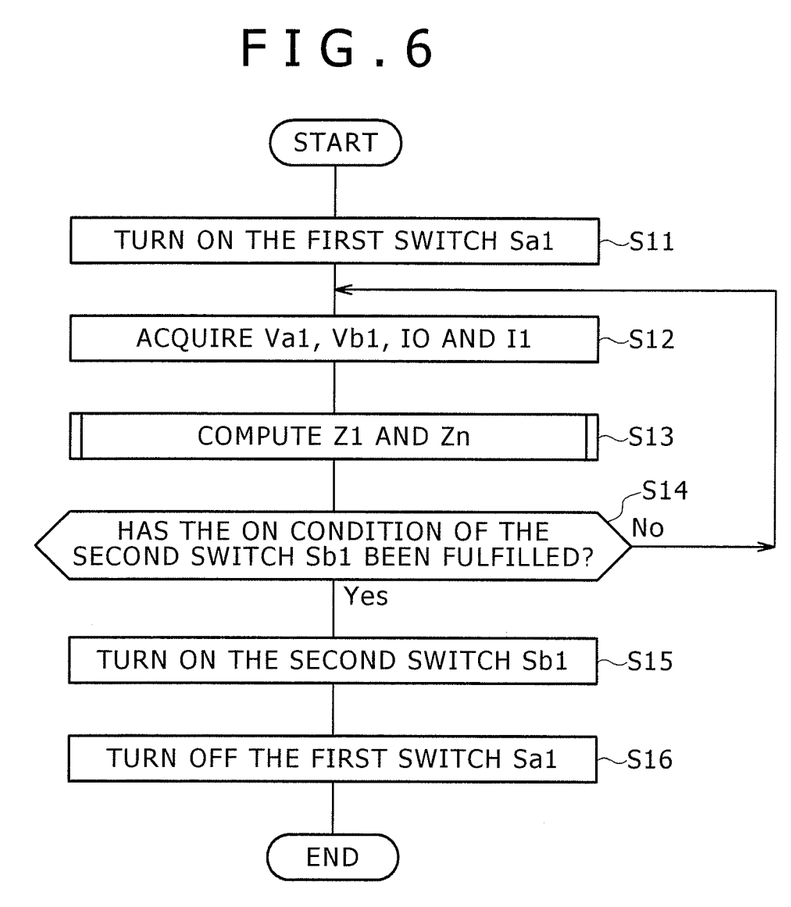
FIG. 6 is a flowchart showing the operation of the battery system according to the embodiment of the invention.

Next, the operation of the battery system (the battery pack) 203B according to the embodiment of the invention is described hereinafter with reference to FIG. 6. FIG. 6 is a flow chart showing the operation of the battery system (the battery pack) 203B according to the embodiment of the invention.

Further, a flow shown in FIG. 6 is started upon the controller CTRB acquiring information to the effect that the connection-target battery unit BTU1 is connected to the battery system (the battery pack) 203B (for example, upon a manipulation being inputted by a maintenance worker).

In step S11, upon acquisition of the information to the effect that the connection-target battery unit BTU1 is connected to the battery system (the battery pack) 203B, the switch-operation control part CTR3 of the controller CTRB executes a control so as to turn the first switch Sa1 into the on state, as shown in FIG. 6. By so doing, the first switch Sa1 turned into the on state. Then, the battery unit BTU1 is connected to the battery system 203B via the precharge resistor Zpr1. By so doing, at the time when the connection-target battery unit BTU1 is connected to the battery system, it is possible to deter an excess current such as a rush current, and so forth, capable of flowing immediately after such connection, and so forth.

In step S12, the controller CTRB, and the battery-unit voltage acquisition part CTR2 of the controller CTRB acquire the voltage detection information piece Va1 of the battery unit BTU1, the voltage detection information piece Vb1 of the battery bank voltage detector Vb1, the current detection information piece I1 of the first current detector I1, a current detection information I0 of the second current detector 10, respectively.

In step S13, the resistance-value acquisition part CTR1 of the controller CTRB acquires the respective internal resistance value information pieces Z1, Zn of the battery banks V1-Vn by computation as described later on.

Herein, there is described the significance of acquiring the respective internal resistance value information pieces Z1, Zn of the battery banks V1-Vn. Suppose the case where the connection-target battery unit BTU1 with the second switch Sb1 kept in the on condition is connected to the battery system 203B. At this point in time, a current I1 flowing through the connection-target battery unit BTU1, with the battery system 203B in the state of charge, will be a portion of a current I0 flowing through the battery system 203B, resulting from proportional distribution of the current, according to the respective internal resistance value information pieces Z1, Z2 of the battery banks V1-Vn. Accordingly, if the absolute value |Z1-Z2| of a difference between the respective internal resistance value information pieces Z1, Z2 of the battery banks V1-Vn is converged within a predetermined scope, the current I1 flowing through the connection-target battery unit BTU1 can be regarded substantially equal in magnitude to a current In of the already-connected battery unit BTUn (corresponding to the fulfillment of an equal-current condition described later on). The above is the reason why the respective internal resistance value information pieces Z1, Z2 of the battery banks V1-Vn are acquired.

In step S14, the switch-operation control part CTR3 of the controller CTRB determines whether or not the equal-current condition preset in the switch-operation control part CTR3, as the on condition of the second switch Sb1, has been fulfilled, the equal-current condition being described in detail later on.

If a determination is made to the effect that the equal-current condition is not fulfilled according to the result of a determination made in the step S14, the controller CTRB causes a process flow to revert to the step S12, proceeding to the subsequent steps from then onwards. On the other hand, if a determination is made to the effect that the equal-current condition is fulfilled according to the result of the determination made in the step S14, the controller CTRB causes the flow to go to the next step S15.

In the step S15, the switch-operation control part CTR3 of the controller CTRB executes a control so as to turn the second switch Sb1 into the on state. By so doing, the second switch Sb1 will be in the on state, whereupon the battery unit BTU1 will be directly connected to the battery system 203A instead of via the precharge resistor Zpr1. By so doing, heat generation occurring to the precharge resistor Zpr1, in the case where the battery unit BTU1 is connected to the battery system 203A via the precharge resistor Zpr1, is inhibited.

In step S16, the switch-operation control part CTR3 of the controller CTRB executes a control so as to turn the first switch Sa1 into the off state. By so doing, the first switch Sa1 will be in the off state. In short, the first circuit Ca1 including the precharge resistor Zpr1 will be in an open state. By so doing, the heat generation occurring to the precharge resistor Zpr1, in the case where the battery unit BTU1 is connected to the battery system 203A via the precharge resistor Zpr1, can be inhibited with certainty.

(The on Condition of the Second Switch Sb1: The Equal-Current Condition)

Figure 7A:
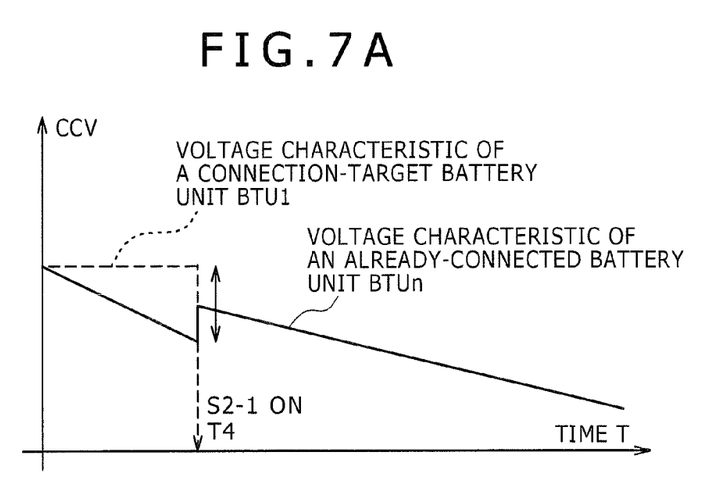
FIG. 7A a schematic representation showing an operation of the battery system according to the embodiment of the invention in the case where an equal-current condition is adopted as the on condition of the second switch.
Figure 7B:
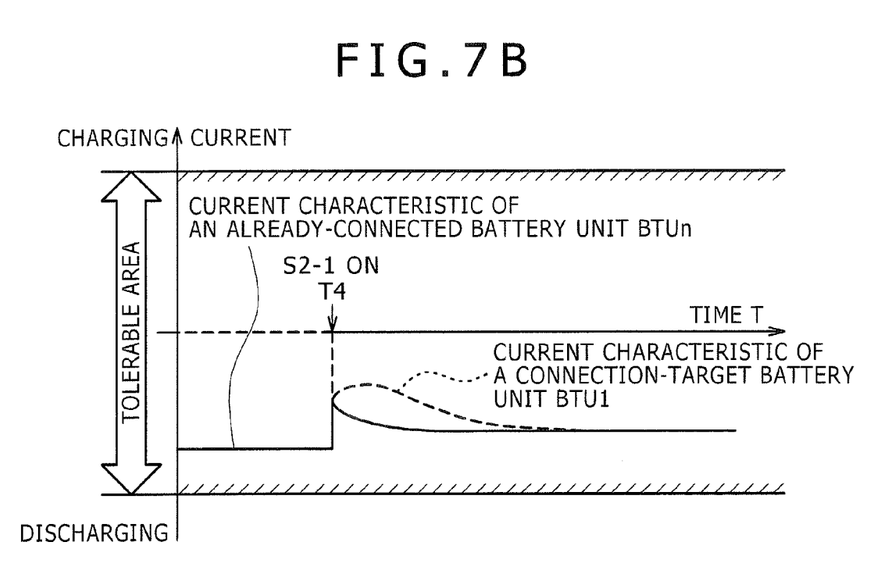
FIG. 7B a schematic representation showing another operation of the battery system according to the embodiment of the invention in the case where the equal-current condition is adopted as the on condition of the second switch.
Figure 7C:
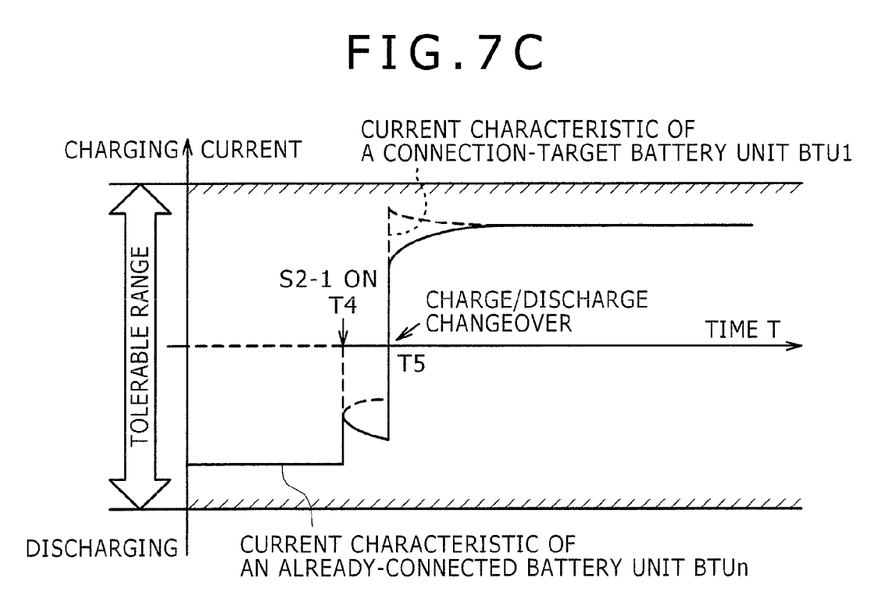
FIG. 7C a schematic representation showing still another operation of the battery system according to the embodiment of the invention in the case where the equal-current condition is adopted as the on condition of the second switch.

Next, in the case where the equal-current condition is adopted as the on condition of the second switch Sb1, the operation of the battery system 203B according to the embodiment of the invention is described with reference to FIGS. 7A to 7C. FIGS. 7A to 7C each are a schematic representation showing the operation of the battery system 203B according to the embodiment of the invention in the case where the equal-current condition is adopted as the on condition of the second switch Sb1.

Further, the equal-current condition means the on condition of the second switch Sb1, preset in the controller CTRA, so as to control the second switch Sb1 to be in the on condition in the case where the absolute value |I1−In| of a difference between the current detection information piece I1 of the connection-target battery unit BTU1, and the current detection information piece In of the battery unit BTUn that is already connected to the battery system 203B is converged within a predetermined tolerable range.

In the case where the equal-current condition is adopted as the on condition of the second switch Sb1, after the connection target battery unit BTU1 is connected to the battery system 203B in the state of discharge (the second switch is changed over from the off state to the on state: refer to elapsed-time T4 in FIG. 7A), the closed circuit voltage (CCV) of the battery unit BTU1 after connection, and the closed circuit voltage (CCV) of the already-connected battery unit BTUn will trail a substantially common locus indicating a linearly decrementing characteristic, as shown in FIG. 7A, as is the case with the equal-SOC condition.

Meanwhile, if the battery unit BTU1 after connection is compared with the already-connected battery unit BTUn from the standpoint of magnitude of a current flowing before, and after the elapsed-time T4 in FIG. 7B, the currents flowing through the battery unit BTU1, and the battery unit BTUn, respectively, immediately after connection, will become equal in magnitude, as shown in FIG. 7B. Thereafter, a difference in magnitude between the respective currents occurs according to a difference in the SOC, and the currents flowing through the battery unit BTU1 and the battery unit BTUn, respectively, undergo convergence in magnitude over time.

If a charge/discharge changeover as indicated at elapsed-time T4 in FIG. 7C occurs in the process of the convergence, shown in FIG. 7B, a difference in magnitude between the currents flowing through the battery unit BTU1, and the battery unit BTUn, respectively, occurs according to a difference in the SOC. However, even if the charge/discharge changeover occurs, a probability of an abnormally excess current flowing under the equal-current condition can be held back low as compared with the case of the equal-voltage condition. This is because a time period during which the difference in the SOC is large until the occurrence of convergence in magnitude of the current is short, and furthermore, in the case of a large difference in the SOC, the connection hardly takes place in the first place.

Accordingly, in the case where the control for the changeover of the second switch from the off state to the on state, as the on condition of the second switch Sb1, under the equal-current condition, is applied to the battery system 203B according to the embodiment of the invention, the probability of an abnormally excess current flowing can be held back low as compared with the case of the equal-voltage condition even if the charge/discharge changeover occurs under the equal-current condition, as shown in FIG. 7C.

{Method for Finding the on Condition of the Second Switch Sb1 (the Equal-Current Condition)}

Next, there is described hereinafter a method for finding the on condition of the second switch Sb1 (the equal-current condition).

It is assumed that the battery system 203B according to the embodiment of the invention is in a state unconnected to the battery unit BTU1, as a precondition. Further, it is assumed that a DC system voltage of the battery system 203B according to the embodiment of the invention is VTOTAL, a voltage difference between the respective ends of the battery bank Vn of the battery unit BTUn is Vn (refer to FIG. 5A), an internal resistance value of the battery bank Vn is Zn (refer to FIG. 5A), magnitude of a current flowing through the battery system 203B is I0 (refer to FIG. 5A), and the number of the battery systems presently connected with each other is (n−1) (provided that "n" is a natural number).

Then, the DC system voltage VTOTAL of the battery system 203B without the battery unit BTU1 connected thereto can be represented as follows (formula 1):

$$V\text{TOTAL}=Vn+Zn\times I0/(n-1) \tag{1}$$

Further, with the battery system 203B kept in the state unconnected to the battery unit BTU1, the DC system voltage VTOTAL at the instant of turning the second switch Sb1 (refer to FIG. 5A) of the connection-target battery unit BTU1 into the on condition can be represented as follows (formula 2): Provided that a voltage difference between the respective ends of the battery bank V1 of battery unit BTU1 is V1 (refer to FIG. 5A), and an internal resistance value of the battery bank V1 is Z1 (refer to FIG. 5A).

$$V\text{TOTAL}=V1+Z1\times I0/n \tag{2}$$

Immediately after the second switch Sb1 (refer to FIG. 5A) is turned into the on condition under an ideal equal-current condition, a current flowing through the battery units BTU1, ..., BTUn, respectively, is I0/n. Further, voltages of the battery units BTU1, ..., BTUn, respectively, are equal. Accordingly, the following formula (formula 3) holds:

$$V1+Z1\times I0/n=Vn+Zn\times I0/n \tag{3}$$

Formula 4 can be obtained by deformation of (formula 3):

$$V1-Vn=Zn\times I0/n-Z1\times I0/n \tag{4}$$

Now, since the voltage difference Vn (refer to FIG. 5A) between the respective ends of the battery bank Vn of the battery unit BTUn is an open circuit voltage (OCV) of the battery unit BTUn during charging/discharging, acquisition thereof by measurement is difficult to implement. Therefore, (formula 1) is converted as follows (formula 5):

$$Vn=V\text{TOTAL}-Zn\times i0/(n-1) \tag{5}$$

In this case, a time difference between before, and after the throwing of the switch, exists between (formula 1) and (formula 5, however, because a change in a charging state, due to the time difference, is minute, (formula 1) can be approximated to (formula 5).

(Formula 5) is substituted for (formula 4), whereupon (formula 6), and (formula 7) are sequentially obtained as follows:

$$V1-(V\text{TOTAL}-Zn\times I0/(n-1))=Zn\times I0/n-Z1\times I0/n \tag{6}$$

$$V1-V\text{TOTAL}=Zn\times I0\times\{1/n-1/(n-1)\}-Z1\times I0/n \tag{7}$$

Herein, a time when the left side (V1−VTOTAL) of (formula 7) is equal to the right side (Zn×(I0/n−I0/(n−1))−Z1×I0/n) of (formula 7) corresponds to a suitable on condition of the second switch Sb1 (the equal-current condition).

The voltage difference V1 between the respective ends of the battery bank V1 of battery unit BTU1, in (formula 7), corresponds to the voltage detection information piece Vb1 of the battery bank voltage detector Vb1, and the DC system voltage VTOTAL corresponds to the voltage detection information piece Va1 of the connection-target battery unit BTU1, respectively. Accordingly, a solution of the left side of (formula 7) can be found on the basis of the information pieces Vb1, Va1, obtainable by the controller CTRA.

Further, magnitude I0 of the current flowing through the battery system 203B, in the right side (Zn×(I0/n−I0/(n−1))−Z1×I0/n) of (formula 7) can be acquired from the current detection information piece I0 of the second current detector I0. The number "n" of the battery systems can be acquired on the basis of an actual system configuration. The respective resistance values Z1, Zn of the battery banks V1-Vn can be found by the following procedure. Accordingly, the solution of the right side of (formula 7) can be found on the basis of information I0 obtainable from the current detection information piece I0 of the second current detector I0, the number n of the battery systems, and the respective resistance values Z1, Zn of the battery banks V1-Vn.

(Method for Finding the Respective Resistance Values Z1, Zn of the Battery Banks V1-Vn)

Next, there is described a method for finding the respective resistance values Z1, Zn of the battery banks V1-Vn. It is assumed that the battery system 203B according to the embodiment of the invention is in a state connected to the battery unit BTU1, and the first switch Sa1 is in the on state (refer to FIG. 5A), as a precondition. Further, it is assumed that an electromotive force of the battery bank V1 of the battery unit BTU1 is V1, a resistance value of the precharge resistor Zpr1 of the battery unit BTU1 is Zpr1, and the magnitude of the current flowing through the battery unit BTU1 is I1. In this case, the DC system voltage VTOTAL can be represented as follows (formula 8):

$$V\text{TOTAL}=V1+(Z1+Zpr1)\times I1 \tag{8}$$

(Formula 8) can be transformed to (formula 9) as follows:

$$Z1=-(V1-VTOTAL)/I1-Zpr1 \quad (9)$$

Further, (V1−VTOTAL), in the right side of (formula 9), can be found on the basis of the information pieces Vb1, Va1, obtainable by the controller CTRA, as previously described. Further, the magnitude I0 of the current, in the right side of (formula 9), can be found from the current detection information piece I1 of the first current detector I1. Then, the resistance value Zpr1 of the precharge resistor Zpr1 is already known. Accordingly, a solution of Z1, in the left side of (formula 9), can be found by substituting (V1−VTOTAL), I1, and Zpr1, obtained by those procedures respectively, into the right side of (formula 9).

Next, there is described a method for finding the resistance value Zn of the battery bank Vn. It is assumed that the battery system 203B according to the embodiment of the invention is in a state connected to the battery unit BTUn, and the second switch Sbn is in the on state (refer to FIG. 5A), as a precondition. Further, it is assumed that an electromotive force of the battery bank Vn of the battery unit BTUu is Vn, and the magnitude of the current flowing through the battery unit BTUu is In. In this case, the DC system voltage VTOTAL can be represented as follows (formula 10):

$$VTOTAL=Vn+Zn\times In \quad (10)$$

Since (formula 8), and (formula 10) have the left side (VTOTAL) in common, these formulas can be represented as follows (formula 11) by connecting the respective right sides of thereof to each other with the use of an equal sign:

$$Vn+Zn\times In=V1+(Z1+Zpr1)\times I1 \quad (11)$$

(Formula 11) can be transformed to (formula 12) as follows:

$$Zn=(V1-Vn)/In+(Z1+Zpr1)\times I1/In \quad (12)$$

Further, the respective electromotive forces V1−Vn of the battery banks V1-Vn, in the right side of (formula 12), can be estimated on the basis of the respective SOCs of the battery banks V1-Vn. Further, as to (Z1+Zpr1), these values have a relationship of Z1<<Zpr1, so that calculation may be made on the assumption of (Z1+Zpr1)≈Zpr1. Further, the magnitude I1, and the magnitude I0, in the right side of (formula 12), can be acquired from the current detection information piece I1 of the first current detector I1, and the current detection information piece I0 of the second current detector I0, respectively. Furthermore, the resistance value Zpr1 of the precharge resistor Zpr1 is already known. Accordingly, a solution of Zn, in the left side of (formula 12), can be found by substituting (V1−Vn), In, (Z1+Zpr1), and I1, obtained by those procedures respectively, into the right side of (formula 12).

(Operation Effect of the Battery System (the Battery Pack) 203 According to the Embodiment of the Invention)

The battery system (the battery pack) 203 according to the embodiment of the invention is a battery system made up by connecting multiple the battery units BTU1, . . . , BTUn, in parallel with each other, the battery units including the battery banks V1-Vn, respectively, the battery banks being made up by connecting multiple the storage batteries, and the switching circuits SW1, . . . , SWn, connected in series to the battery banks V1-Vn, respectively, the switching circuits SW1, . . . , SWn being made up by connecting the first circuits Ca1, . . . , Can, having first switches Sa1, . . . , San, connected in series to the precharge resistors Zpr1, . . . , Zprn, having a known resistance value, in parallel with the second circuits Cb1, . . . , Cbn, having the second switches Sb1, . . . , Sbn, respectively.

The plural battery units BTU1, . . . , BTUn have the battery bank voltage detectors Vb1, . . . , Vbn for detecting a voltage difference between the respective ends of each of the battery banks V1-Vn, respectively, and the first current detector I1, . . . , In, for detecting currents flowing through the battery banks V1-Vn, respectively. The battery system has the second current detector I0 for detecting the current flowing through the battery system. Further, the battery system is provided with the controller CTRB for controlling the respective outputs of the plural battery units BTU1, . . . , BTUn.

The controller CTRB turns the first switch Sa1 into the on state in the connection-target battery unit BTU1 when the connection-target battery unit to serve as the target for connection is connected to the battery system 203B, turning the first switch into the off state after the second switch Sb1 is turned off, thereby controlling the on/off states of the first and second switches Sa1, Sb1, respectively, on the basis of the current detection information piece I1 of the first current detector, the current detection information piece I0 of the second current detector, and the voltage detection information piece Vb1 of the battery bank voltage detector, when the second switch Sb1 is turned the OF state.

With the battery system (the battery pack) 203B according to the embodiment of the invention, an excess current can be deterred even in the case where the state of the battery system 203 after connection is suddenly changed over from discharging to charging after the connection-target battery unit BTU1 is connected to the battery system 203B.

If the present invention is applied to, for example, a battery system made up by mixing a battery unit comprised of lead storage batteries generally for use without a controller, respectively, with a battery unit comprised of lithium ion batteries generally for use with a controller, respectively, in particular, this will enable excellent excess-current deterrence effects to be exhibited.

Further, for the controller CTRB, there may be adopted a configuration having the resistance-value acquisition part CTR1 for acquiring the internal resistance value of the battery system 203B, the respective internal resistance values of the battery units BTU1, . . . , BTUn, and the respective internal resistance values of the battery banks V1-Vn, the battery-unit voltage acquisition part CTR2 for acquiring the voltage difference between the respective ends of each of the plural battery units BTU1, . . . , BTUn, and the switch-operation control part CTR3 for controlling the on/off state of the first and second switches Sa1, Sb1, respectively, on the basis of the current detection information piece I1 of the first current detector in the connection-target battery unit BTU1, the current detection information piece I0 of the second current detector, the resistance value information pieces Z1, Zn, acquired by the resistance-value acquisition part CTR1, the respective voltage detection information pieces Vb1, . . . , Vbn of the battery bank voltage detectors, and the respective voltage difference information pieces Va1, . . . , Van, detected by the battery unit voltage detectors Va1, . . . , Van.

Further, the switch-operation control part CTR3 of the controller CTRB may adopt a configuration whereby a first switch-operation condition information piece as a solution of V1−Vn, obtained by subtracting the product I0*Zn=Vn of the current detection information piece I0 of the second current detector, according to the battery system, and the resistance value Zn of the battery system, acquired by the resistance-value acquisition part from the product I1*Z1=V1 of the current detection information piece I1 of the first current detector, according to the battery bank, and the resistance value information piece Z1 acquired by the resistance-value acquisition part is found on one hand, and a second switch-operation condition information piece as a solution of Va1−Vb1, obtained by subtracting the voltage detection information piece Vb1 of the battery bank voltage detector Vb1 from the product Va1=I1*(Z1+Zpr1) of the current detection information I1 of the first current detector, according to the battery bank, and the battery unit resistance value Z1+Zpr1, acquired by the resistance-value acquisition part, is found on the other hand. Then, the switch-operation control part CTR3 of the controller CTRB may adopt a configuration whereby the on/off states of the first and second switches Sa1, Sb1, respectively, are controlled on the basis of the first switch-operation condition information piece, and the second switch-operation condition information piece, respectively.

Further, the switch-operation control part CTR3 of the controller CTRB may adopt a configuration whereby if a difference between the first switch-operation condition information piece, V1−Vn, and the second switch-operation condition information piece, Va1−Vb1, is converged within a predetermined scope, the second switch Sb1 is controlled so as to be in the on state.

Further, a configuration may be adopted whereby the plural battery units BTU1, . . . , BTUn each have the controller CTRB.

Further, the switch-operation control part CTR3 of the controller CTRB may adopt a configuration whereby a voltage information piece Vb1 of the battery system is found on the basis of a solution Vb1=(I1**Z1)+V1, obtained by adding the voltage detection information piece V1 of the battery bank voltage detector to the product (I1*Z1) of the current detection information piece I1 of the first current detector, according to the battery bank, and the resistance value information piece Z1 of the battery bank, acquired by the resistance-value acquisition part, when the first switch Sa1 is in the on state, and if a difference V1−Vb1 between the voltage detection information piece V1 of the battery bank voltage detector and the voltage information piece Vb1 of the battery system, is converged within a predetermined scope, the second switch Sb1 is controlled so as to be in the on state.

Still Further, the switch-operation control part CTR3 of the controller CTRB may adopt a configuration whereby the resistance value Z1 of the battery bank V1 is found from a ratio Vb1/I1 of the voltage detection information piece Vb1 of the battery bank voltage detector to the current detection information piece I1 of the first current detector I1, according to the battery bank V1, and the internal resistance value Zn of the battery system (the battery unit BTUn) is found from a ratio Vn/(I0−I1) of the voltage detection information piece Vn of the battery bank voltage detector to a difference between the current detection information piece I0 of the second current detector I0, according to the battery system (the battery unit BTUn), and the current detection information piece I1 of the first current detector I1, according to the battery bank V1, when the first switch Sa1 is in the on state, the second switch Sb1 being controlled so as to be in the on state if a solution Zn*I0*{1/n−1/(n−1)}−Z1*I0/n, obtained by subtracting a function of the product of the resistance value Z1 of the battery bank V1, as found, and the current detection information piece I0 of the second current detector I0, according to the battery system (the battery unit BTUn), from a function Zn*I0*{1/n−1/(n−1)}| of the product between the internal resistance value Zn of the battery system (the battery unit BTUn), and the current detection information piece I0 of the second current detector I0, according to the battery system (the battery unit BTUn), is converged within a predetermined scope.

OTHER EMBODIMENTS

The above described plural embodiments of the invention indicate examples in which the present invention is implemented. Accordingly, it is to be pointed out that the invention be not limited thereto and that various changes and modifications may be made in the invention without departing from the spirit and scope thereof.

For example, with the embodiment of the invention, described as above, the precharge resistors Zpr1, . . . , Zprn, provided in the plural battery units BTU1, . . . , BTUn, respectively, may have a common resistance value, or resistance values differing from each other.

What is claimed is:

1. A battery system comprising:
a plurality of battery units, the battery unit having a battery bank made up by connecting a plurality of storage batteries with each other, and a switching circuit, connected in series to the battery bank, the plural battery units being connected in parallel with each other,
wherein the switching circuit is made up by connecting a first circuit comprising a first switch connected in series to a precharge resistor in parallel with a second circuit comprising a second switch,
wherein the plural battery units each comprise:
a battery bank voltage detector that detects a voltage difference between the respective ends of the battery bank; and
a first current detector that detects a current flowing through the battery bank,
wherein the battery system has a second current detector that detects a current flowing through the battery system, and is provided with a controller that controls respective outputs of the plural battery units, and
wherein the controller turns the first switch into the on state in a connection-target battery unit to serve as a target for connection when the connection-target battery unit is connected to the battery system, turning the first switch into the off state after the second switch is turned into the off state, whereupon the on/off state of the first switch and the second switch, respectively, is controlled on the basis of a current detection information piece of the first current detector, a current detection information piece of the second current detector, and a voltage detection information piece of the battery bank voltage detector when the second switch is turned into the off state.

2. The battery system according to claim 1, wherein the controller comprises:
a resistance-value acquisition part that acquires respective internal resistance values of the battery system, the battery unit, and the battery bank;
a battery-unit voltage acquisition part that acquires a voltage difference between the respective ends of the battery unit; and
a switch-operation control part that controls the on/off state of the first and second switches, respectively, on the basis of the current detection information piece of the first current detector, in the connection-target battery unit, the current detection information piece of the second current detector, a resistance value information piece acquired by the resistance-value acquisition part, a voltage detection information piece of the battery bank voltage detector, and a voltage difference information piece acquired by the battery unit voltage detector.

3. The battery system according to claim 2, wherein the switch-operation control part of the controller finds a first switch-operation condition information piece as a solution obtained by subtracting the product of the current detection information piece of the second current detector, according to the battery system, and the resistance value of the battery system, acquired by the resistance-value acquisition part from the product of the current detection information piece of the first current detector, according to the battery bank, and the resistance value information piece acquired by the resistance-value acquisition part one hand, and a second switch-operation condition information piece as a solution obtained by subtracting the voltage detection information piece of the battery bank voltage detector from the product of the current detection information of the first current detector, according to the battery bank, and the battery unit resistance values acquired by the resistance-value acquisition part on the other hand, thereby controlling the on/off states of the first and second switches, respectively, on the basis of the first switch-operation condition information piece, and the second switch-operation condition information piece, respectively.

4. The battery system according to claim 3, wherein the switch-operation control part of the controller controls the second switch so as to be in the on state if a difference between the first switch-operation condition information piece and the second switch-operation condition information piece is converged within a predetermined scope.

5. The battery system according to claim 4, wherein the plural battery units each comprise the controller.

6. The battery system according to claim 5, wherein the switch-operation control part of the controller finds the voltage information piece of the battery system on the basis of a solution obtained by adding the voltage detection information piece of the battery bank voltage detector to the product of the current detection information piece of the first current detector, according to the battery bank, and the resistance value information piece of the battery bank, acquired by the resistance-value acquisition part, when the first switch is in the on state, thereby controlling the second switch so as to be in the on state if a difference between the voltage detection information piece of the battery bank voltage detector and the voltage information piece of the battery system is converged within a predetermined scope.

7. The battery system according to claim 5, wherein the switch-operation control part of the controller finds an internal resistance value of the battery bank from a ratio of the voltage detection information piece of the battery bank voltage detector, to the current detection information piece of the first current detector, according to the battery bank, when the first switch is in the on state, and finds an internal resistance value of the battery system from a ratio of the voltage detection information piece of a battery bank voltage detector to a difference between the current detection information piece of the second current detector, according to the battery system, and the current detection information piece of the first current detector, according to the battery bank, when the first switch is in the on state, the switch-operation control part controlling the second switch so as to be in the on state if a solution obtained by subtracting a function of the product of the resistance value of the battery bank, as found, and the current detection information piece of the second current detector, according to the battery system, from a function of the product of the internal resistance value of the battery system, and the current detection information piece of the second current detector, according to the battery system is converged within a predetermined scope.

* * * * *